United States Patent Office 3,421,011
Patented Jan. 7, 1969

3,421,011
INCREMENTAL TRANSDUCER COMPRISING GRATING TRAVERSED BY LIGHT RAY A PLURALITY OF TIMES
Fromund Hock, Wetzlar, Germany, assignor to Ernst Leitz G.m.b.H., Wetzlar, Germany
Filed July 6, 1967, Ser. No. 651,419
Claims priority, application Germany, July 16, 1966,
L 54,090
U.S. Cl. 250—231　　　　　　　　　　3 Claims
Int. Cl. G01d 5/34

ABSTRACT OF THE DISCLOSURE

In a photoelectric incremental transducer either having a grating which is projected on a second and reflecting grating or having one reflecting grating which is projected onto itself, means are disclosed for suppressing the D-C portions of the position defining signals by generating a four-phase electrical rotatory field.

The transducer comprises in known manner a polarizing beam doubling element, e.g. a Wollaston prism and a—preferably electro-magnetically operated—reflecting element adapted to reflect the two beams obtained from said beam doubling element onto said reflecting grating and, in turn, to two photoelectric receivers for generating position defining signals. As said beam splitting element a beam splitting cube is employed, said cube being adapted to transmit the light reflected by the lines of said reflecting grating to a polarizing beam splitter. The latter reflects the light onto two additional photoelectric receivers the output signals of which are counter-phased to said position defining signals, thereby generating the above mentioned four-phase electrical rotatory field. The four generated signals are conducted in pairs to two push-pull amplifiers with a high common mode rejection wherein the D-C portions of said signals are suppressed.

CROSS-REFERENCE TO RELATED APPLICATIONS

Applicant claims priority under 35 U.S.C. 119 for application L 54,090 IXb/42d, filed on July 16, 1966 in the Patent Office of the Federal Republic of Germany.

BACKGROUND OF THE INVENTION

Field of the invention

The invention relates to a measuring apparatus for determining the length or an angle of an object. More specifically, the invention relates to a measuring device which comprises a light source, an optical system, a grating which is displaceable relative to said optical system, and photoelectric receivers. By the displacement of said grating—which may be a linear or a rotary motion—the light flux is caused to vary periodically which variations are converted to photoelectric current fluctuations and may be used in electronic counting techniques or analogous evaluations.

Description of the prior art

Measuring devices of the above described type are known to those skilled in this particular art as photoelectric incremental transducers. They may be used for measuring the extent of the motion of the grating relative to an object, thereby defining the length of said object. According to the same principle an angle may be measured or the angular position of an object may be determined by a device commonly called incremental angle transducer, wherein said grating is a disc having radially extending lines and wherein the motion of said grating is a rotatory one.

From the photoelectric receivers a pulsating D-C current is obtained which may be considered to consist of an D-C level superimposed by an A-C current. This D-C level, however, is not constant. Owing to variations in the average light flux between light source and receiver which may be caused by light-source-aging or by varying transmission properties of the optical parts as may be caused by dust particles etc. the D-C level of the signals shifts proportional to this influence. Since in most embodiments of incremental transducers this D-C level is related to a trigger level the trigger points therefore also do shift, thereby introducing measuring errors.

In order to eliminate the shifting of this average D-C level it is already known in the art to generate additional signals which are counter-phased to the position-defining signals and to supply position-defining signals and counter-phased signals to push-pull amplifiers with common mode rejection.

SUMMARY OF THE INVENTION

The present invention pertains to a special manner of generating the above mentioned counter-phased signals. According to the invention this is accomplished by disposing a beam splitter in the path of the light rays by which an image of the grating is formed on another part of said grating, more specifically, by disposing said beam splitter behind a beam-doubling element in the direction of the light rays. The use of beam-doubling elements with incremental transducers, which elements also polarize each of said beams in directions normal to each other is already known in this particular art. The newly introduced beam splitter, however, is adapted to transmit portions of the light rays which are reflected from the lines of the grating to a polarizing beam splitter by which said rays are transmitted or reflected respectively according to the direction in which they are polarized to two photoelectric receivers. From said receivers two additional signals are obtained which are offset in phase by 180° relative to the originally generated position-defining signals.

In pairs of two the four signals are then conducted to two push-pull amplifiers with high common mode rejection.

It is a further object of the invention to provide a means adapted to stabilize the brightness of the light source. This can be done by extracting from an amplifier stage from where the sum-signal may be obtained the D-C portions of the signals and by utilizing said portions as a control signal for the mains receiver by which the light source is charged.

DESCRIPTION OF THE PREFERRED EMBODIMENT

Figure 1:
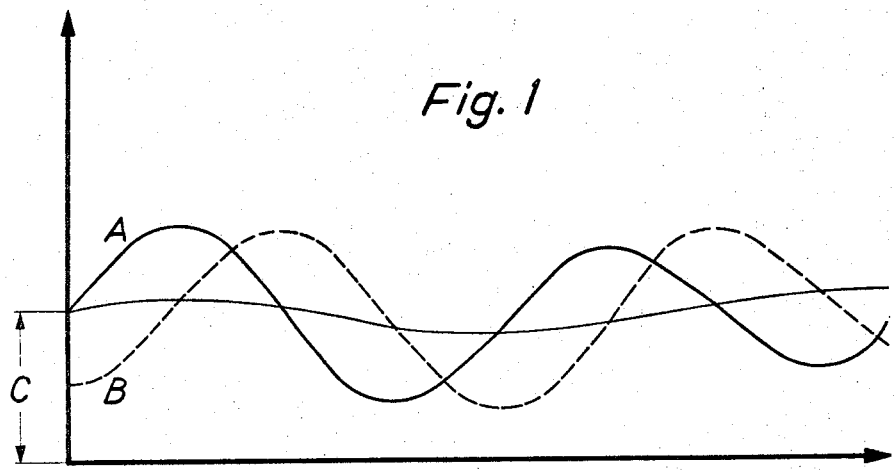
FIGURE 1 is a diagram illustrating the waves of the position-defining signals.
Figure 2:
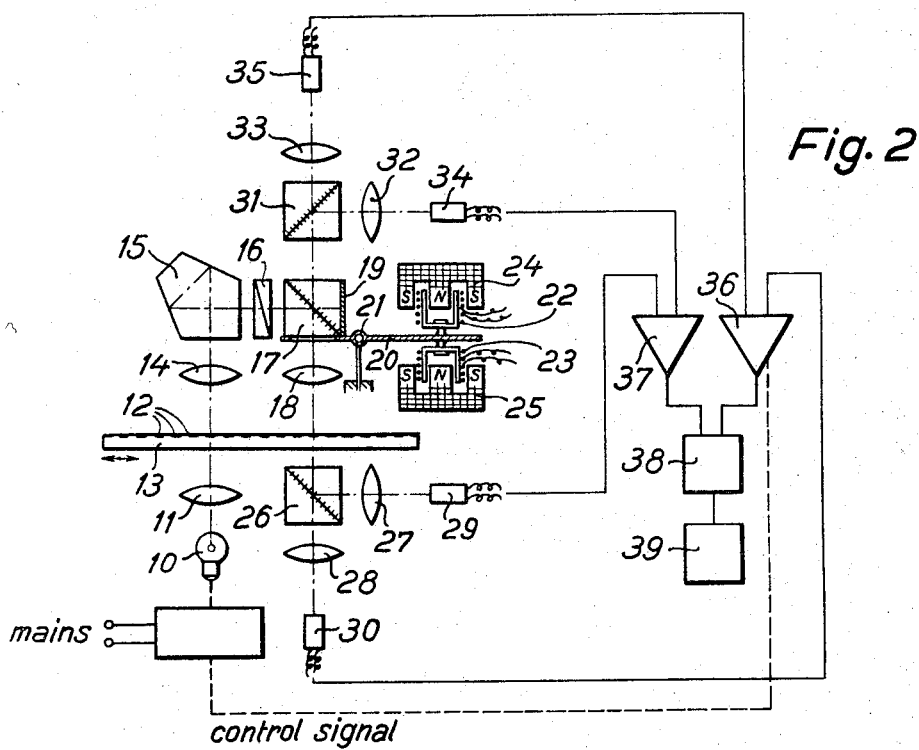
FIGURE 2 shows schematically the essential parts of an incremental transducer with elements added for generating a four-phase electrical rotatory field according to the invention.

In FIGURE 1 the pulsating D-C currents generated by the photoelectric receivers 29, 30 of FIGURE 2 are diagrammatically depicted as waves A and B. They may be considered to result from a straight D-C current superimposed by an A-C current. C is then the D-C level of which hereinbefore it was stated that it changes owing to various influences, as for example aging of the light source. It is the object of the invention to stabilize this D-C level in order to eliminate measuring errors which otherwise would be introduced by this changing level.

In FIGURE 2 a grating 13 is depicted having reflecting lines 12 thereon. Part of this grating is illuminated by a light source 10 and a condenser 11. By means of an objective 14, as pentaprism 15, a beam-doubling Wollaston prism 16 which polarizes each of said beams in directions normal to each other, a beam splitting cube 17, and an objective 18 an image of the illuminated part of the grating is projected on the same grating. Both objectives 14 and 18 form images of the ratio 1:1.

The beam splitting cube 17 is provided with a non-polarizing beam splitting surface 17' and is on one side covered by means for annihilating the light rays that have transmitted said surface 17', e.g. a black coating.

Cube 17 is mounted on one end of a two-armed lever 20, the latter being pivotably rested on stud 21. Two coils 22, 23 are fixed to the other end of lever 20, the coils being part of two stationary mounted permanent moving coil magnets 24, 25. By conducting a current through said coils the cube 17 may be pivoted, thereby displacing the image of the grating 13. Displacing the image on the grating results in changing the phase displacement of the position-defining signals which may thus be adjusted. To this end other means may be employed with equal results, for example mechanical set screws.

Disposed behind the grating 13 in the direction of the light flux is a polarizing beam splitter 26 adapted to reflect the differently polarized portions of the image-forming light rays according to their polarization-direction onto two photoelectric receivers 29, 30 via two field lenses 27, 28.

Above cube 17 as depicted in FIGURE 2 a second polarizing beam splitter 31 is arranged for transmitting those light rays reflected by the lines of the grating to two photoelectric receivers 34, 35 after having passed through two field lenses 32, 33. The output signals of said receivers being necessarily counter-phased to the output signals of the receivers 29, 30, since the receivers 34, 35 are illuminated in instances when the receivers 29, 30 do not receive any light and vice versa.

A minor horizontal swing of beam splitting cube 17 is of no effect on the generating of the counter-phased signals since for the light rays reflected by the grating said cube has merely the effect of a plane-parallel plate in the path of parallel light rays.

The counter-phased signals of the receivers 29, 34 and 30, 35 are in pairs supplied to push-pull amplifiers 36, 37 having high common mode rejection. The symmetrical outputs of said amplifiers suppress in a manner known per se the above mentioned D-C portions of the signals. From an amplifier stage where the sum-signal is formed the D-C portions of the signals may be extracted and may be used to control the brightness of the light source 10 as is indicated in FIGURE 2 by the dotted line 40.

The output signals of the push-pull amplifiers 36, 37 are conducted to a discriminator for the counting direction 38, to which in turn is connected an up-down-counter 39 for digitally indicating the result of the measurement.

What is claimed is:
1. A photoelectric incremental transducer comprising:
    a partially transparent grating (13) having equi-distantly positioned non-transparent lines (12) thereon, said grating being displaceable;
    a light source (10) adapted to illuminate part of said grating;
    optical means (14, 15, 18) adapted to project an image of said illuminated part of said grating onto a second part of said grating, said optical means further including
    an optical element (16) disposed on the opposite side of the grating from where said light source is arranged, said optical element being adapted to double the light beams passing through said grating thereby polarizing each of said beams in directions normal to each other;
    a beam splitting element (17) in the path of said light rays;
    means (20, 24, 25) adapted to displace said beam splitting element for adjusting the position of the image projected onto said grating;
    a polarizing beam splitting element (26) disposed behind said grating (13) in the direction of the light flux;
    two photoelectric receivers (29, 30) to which said beam splitting element (26) transmit or reflects respectively one of said doubled beams, and being adapted to generate two position-defining photoelectric current signals;
    a second polarizing beam splitting element (31) being disposed behind said first mentioned displaceable beam splitting element (17);
    two photoelectric receivers (34, 35) onto which said second polarizing beam splitting element (31) transmits or reflects respectively this portion of each of said doubled beams which is reflected by the lines (12) of said grating (13), said receivers being adapted to generate two photoelectric current signals which are counter-phased to said first mentioned signals;
    two push-pull amplifiers (36, 37) with high common mode rejection to which the four generated signals are conducted in pairs;
    a discriminator for determining the counting direction (38) to which the output signals of said amplifiers are conducted; and
    an up-down-counter (39) connected to said discriminator for digitally indicating the result of the measurement.

2. A photoelectric incremental transducer according to claim 1 and further comprising means adapted to extract the D-C portions of said signals from an amplifier stage where the sum-signal is formed, said portions being utilized for controlling the brightness of said light source (10).

3. A photoelectric incremental transducer according to claim 1 in which said means adapted to displace said beam splitting element (17) comprises a two-armed lever (20) on one arm of which said beam splitting element (17) is mounted;
    two coils (22, 23), said coils being mounted on two opposite sides of the second lever arm and being chargeable by electric current; and
    two permanent magnets (24, 25) to which said coils (22, 23) are the moving coils.

References Cited
UNITED STATES PATENTS

| 2,849,912 | 9/1958 | Plesse et al. | 250—220 X |
| 3,198,061 | 8/1965 | Hock | 250—237 |

FOREIGN PATENTS

| 637,242 | 3/1962 | Italy. |

ROBERT SEGAL, *Primary Examiner.*

U.S. Cl. X.R.
250—220, 237, 234, 210